(12) United States Patent
Puthoor (10) Patent No.: US 11,231,931 B1
(45) Date of Patent: Jan. 25, 2022

(54) MECHANISM FOR MITIGATING INFORMATION LEAK VIA CACHE SIDE CHANNELS DURING SPECULATIVE EXECUTION

(71) Applicant: ADVANCED MICRO DEVICES, INC., Santa Clara, CA (US)

(72) Inventor: Sooraj Puthoor, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/228,187

(22) Filed: Dec. 20, 2018

(51) Int. Cl.
| | |
|---|---|
| *G06F 9/312* | (2018.01) |
| *G06F 12/0815* | (2016.01) |
| *G06F 12/0897* | (2016.01) |
| *G06F 9/38* | (2018.01) |
| *G06F 12/0875* | (2016.01) |
| *G06F 9/30* | (2018.01) |
| *G06F 12/0817* | (2016.01) |
| *G06F 12/0811* | (2016.01) |

(52) U.S. Cl.
CPC ........ *G06F 9/3806* (2013.01); *G06F 9/30043* (2013.01); *G06F 12/0875* (2013.01); *G06F 9/3842* (2013.01); *G06F 9/3844* (2013.01); *G06F 12/0811* (2013.01); *G06F 12/0815* (2013.01); *G06F 12/0828* (2013.01); *G06F 12/0897* (2013.01); *G06F 2212/452* (2013.01)

(58) Field of Classification Search
CPC .. G06F 9/3806; G06F 9/30043; G06F 9/3804; G06F 9/30058; G06F 9/3842; G06F 9/3844; G06F 9/3846; G06F 9/3848; G06F 12/0875; G06F 12/0817; G06F 12/0828; G06F 12/0815; G06F 12/0897; G06F 12/0811; G06F 2212/452
USPC ......... 712/237–240; 711/121, 122, 133, 135, 711/141, 144
See application file for complete search history.

(56) References Cited

U.S. PATENT DOCUMENTS

| | | | | |
|---|---|---|---|---|
| 5,956,495 A | * | 9/1999 | Kahle | ................ G06F 9/30174 703/26 |
| 6,233,657 B1 | * | 5/2001 | Ramagopal | ........... G06F 9/3834 711/137 |
| 6,658,534 B1 | * | 12/2003 | White | .................. G06F 9/3804 711/137 |
| 6,658,558 B1 | * | 12/2003 | Kahle | ................. G06F 9/30094 712/234 |
| 2007/0050601 A1 | * | 3/2007 | Chaudhry | ........... G06F 9/30181 712/214 |

(Continued)

OTHER PUBLICATIONS

Kocher, Paul, et al., "Spectre Attacks: Exploiting Speculative Execution", Cornell University arXiv:1801.01203, Jan. 3, 2018, 16 pages.

(Continued)

*Primary Examiner* — Daniel H Pan (57) ABSTRACT

A processor includes a first core and a second core to execute computer instructions. Each of the cores includes its own private memory cache and speculative load queue. The speculative load queue stores cachelines for the computer instructions and data when the core is operating in a speculative state with respect to a process or thread. The processor includes a state tracking buffer having a state field to store a speculative exclusive ownership state for each cacheline in the speculative load queue when present therein.

20 Claims, 6 Drawing Sheets

(56) References Cited

U.S. PATENT DOCUMENTS

| | | |
|---|---|---|
| 2010/0138607 A1 | 6/2010 | Hughes et al. |
| 2011/0066820 A1 | 3/2011 | Blundell et al. |
| 2013/0073811 A1 | 3/2013 | Beckmann et al. |
| 2014/0189253 A1 | 7/2014 | Mohandru et al. |
| 2015/0089157 A1 | 3/2015 | Lee et al. |
| 2016/0092359 A1 | 3/2016 | Busaba et al. |
| 2016/0217076 A1* | 7/2016 | Berger ................ G06F 12/0831 |
| 2016/0246723 A1 | 8/2016 | Doshi et al. |
| 2017/0147496 A1 | 5/2017 | Sasanka |
| 2018/0165199 A1 | 6/2018 | Brandt et al. |
| 2018/0203800 A1 | 7/2018 | Daglis et al. |
| 2018/0314637 A1 | 11/2018 | Gschwind et al. |

OTHER PUBLICATIONS

"AMD64 Architecture Programmer's Manual vol. 2: System Programming", Advanced Micro Devices, Section 7.3, Sep. 2018, 8 pages.

Mellor-Crummey, John, "Hardware Memory Models: x86-TSO" Department of Computer Science, Rice University, COMP 522, Lecture 9, Sep. 20, 2016, 27 pages.

Gharachorloo, Kourosh, et al., "Two Techniques to Enhance the Performance of Memory Consistency Models", Proceedings of the International Conference on Parallel Processing, 1991, 10 pages.

Suh, Taeweon, "Integration and Evaluation of Cache Coherence Protocols for Multiprocessor SOCS", A Thesis Presented to the Academic Faculty of Georgia Institute of Technology, Dec. 2006, 153 pages.

* cited by examiner

FIG. 1

| STATE | STORE | LS | FWD_LS | LND | LR | FWD_LR | LNS | DA | INV | S(INV) |
|---|---|---|---|---|---|---|---|---|---|---|
| I | M | I | — | S | S | — | S | — | — | — |
| S | M | S | — | S | S | — | S | — | — | — |
| M | M | M | M(SPEC) | M | M | M | M | — | — | — |
| M(SPEC) | M(SPEC) | M(SPEC) | M(SPEC) | M(SPEC) | M(SPEC) | O | M(SPEC) | M | — | — |
| O | M | O | O | O | O | — | O | — | — | — |

MECHANISM FOR MITIGATING INFORMATION LEAK VIA CACHE SIDE CHANNELS DURING SPECULATIVE EXECUTION

BACKGROUND

Modern processors often employ speculative execution techniques, such as branch prediction and speculative branch execution, to enhance processing efficiency. These speculative techniques typically depend on an execution scheme wherein an architectural state of the processor is updated only after the speculation is confirmed to be correct. That is, speculative execution allows a processor to make calculations down a particular branch of instructions of a program, and after a branching instruction is finally reached, and a destination address is confirmed, any speculative computations are then committed or discarded depending on whether the particular speculative choice was correct.

However, speculation causes permanent changes to microarchitectural structures of the processor including caches, and these state changes can be exploited to leak information. For example, security vulnerabilities may depend in part on monitoring state changes during speculative execution. In particular, processor vulnerabilities can be exploited via "side channel" attacks that induce the processor to speculatively perform operations that would not occur during correct victim program execution. The induced operations cause a leak of confidential information via a side channel. In short, exploitive programming is able to read arbitrary user-space processor memory cache locations used by a victim process operating on the processor across a local security boundary. Speculative execution implementations may violate security assumptions underpinning software security mechanisms including operating system process separation, static analysis, containerization, just-in-time (JIT) compilation, and countermeasures to cache timing and side channel attacks.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Generally, described herein are improved techniques for memory cache coherency protocols and improved speculative execution in processors. Mechanisms and microarchitectural structures to prevent a change to a microarchitectural state of a cache during speculative execution thereby preventing or reducing side channel attacks that are capable of leaking confidential information are also described herein. Processors such as a central processing unit (CPU), a graphics processing unit (GPU), an accelerated processing unit (APU), and the like employ speculative execution to boost performance. For example, when control flow of program execution depends on an uncached value located in a physical memory, it may take many clock cycles before the value becomes known. Rather than wasting hundreds of processor clock cycles by idling, a processor guesses a direction of control flow, saves a checkpoint of its register state, and proceeds to speculatively execute program instructions on the guessed path. These instructions are referred to as transient instructions herein.

In terms of security of memory structures and data and instructions therein, speculative execution involves executing portions of a program which may not be required in the near-term (or at all)—i.e., the speculation was "incorrect." Conventionally, processors have been designed to revert a result of program execution of an incorrect speculative execution back to its prior state to maintain correctness. However, speculative execution of transient instructions creates a microarchitectural state change of one or more processor structures such as caches. State changes may be exploited to leak information from a first processor memory address space by a second process or a second thread during speculative execution by a first process or a first thread. Any information in the first process can be leaked or exfiltrated from the first process or a first thread of the first process.

Described herein are mechanisms to prevent or reduce speculative execution from changing or taking advantage of mechanisms that change microarchitectural states of caches in processors and thus prevent cache side channel attacks during speculative execution of transient instructions. Also described are modifications to processor microarchitectural structures, a cache coherency protocol, and a cache coherency state to facilitate the processor to speculatively fetch data from a memory subsystem without changing cache states of local processor caches until safe to do so. The cache coherency protocol allows changes to caches only after a result or resulting value of the speculative execution is confirmed to be correct. The techniques and structures are useful in symmetric multiprocessing (SMP) systems that involve a hardware architecture where two or more processors or processor cores are connected to a shared on-chip main memory such as, for example, an L2-level memory or an L3-level memory. According to some embodiments, an L1-level memory is a private memory for use by a core of a multi-core processor. Broadly, for speculative execution in a SMP system, instructions and data are played out of a speculative load queue and one or more sharer vectors including a speculative sharer vector to track states and to perform speculative execution without revealing speculative execution to co-executing processes.

Figure 1:
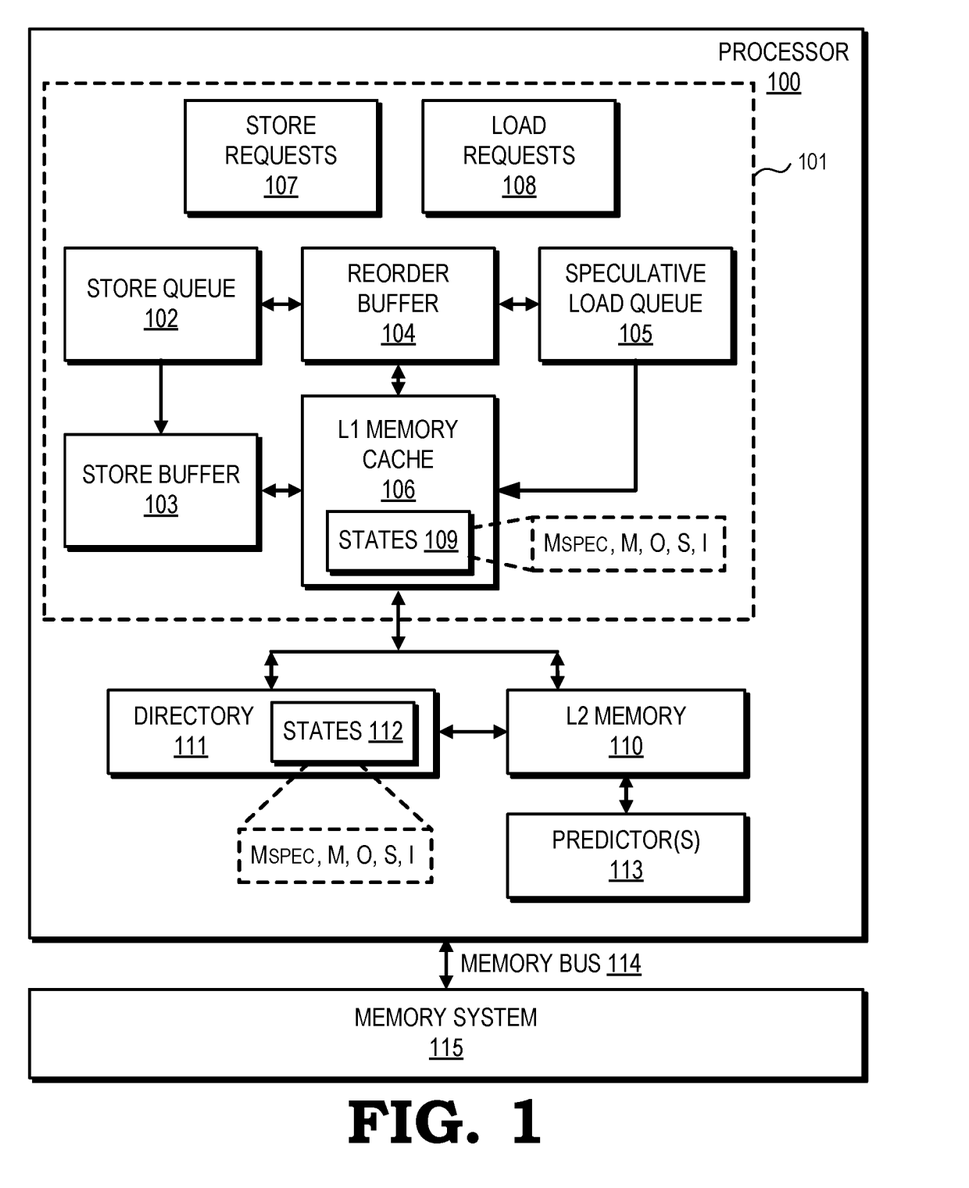
FIG. 1 is a block diagram of a processor architecture implementing cache coherency states and speculative loads in accordance with some embodiments.

FIG. 1 is a block diagram of a processor 100 implementing cache coherency states and speculative loads in accordance with some embodiments. The processor 100 includes a plurality of elements for processing instructions including at least a processing core 101, an L1 memory cache 106, an L2 memory 110, a directory 111, and one or more predictors 113. The L1 memory cache 106 is shown inside the processing core 101 for convenience to indicate that the L1 memory cache 106 is a private memory cache for use by elements of the processing core 101 and elements of the processor 100. In other embodiments, the L1 memory cache 106 is a private memory structure and resides outside of the processing core 101 and facilitates execution of instructions by the processing core 101. The elements of the processing core 101 include a store queue 102, a store buffer 103, a reorder buffer 104, and a speculative load queue 105. The L1 memory cache 106 is coupled to the L2 memory, the directory 111, and the one or more predictors 113.

In the processing core 101, an arithmetic unit and other basic logic units known to those in the art are not illustrated for sake of simplicity but are included for proper operation of the processor 100 including execution of instructions. Instructions for execution in the processing core 101 include store requests 107 and load requests 108. The processing core 101 is a first core representative of one core of a plurality of cores in a multi-core processor such as the processor 100.

The L2 memory 110 communicates with the L1 memory cache 106 through an on-chip interconnect. The L2 memory 110 is coupled to and communicates with a larger off-chip memory system 115 via a memory bus 114. The memory bus 114 couples the L2 memory 110 to the memory system 115. According to some embodiments, stores to the memory system 115 are not issued speculatively and thereby stores to the memory system 115 are made according to conventional mechanisms without regard to memory or cacheline states when stores are issued thereto.

The store queue 102 is coupled to the L1 memory cache 106, the store buffer 103, and the reorder buffer 104. Upon receiving a data request, such as a load request or a speculative load (LS) request, the store queue 102 provides a most recent or most current data value when the processing core 101 stores the most current data value therein. The speculative load queue 105 is also coupled to the L1 memory cache 106.

The processing core 101 includes microstructures capable of performing execution operations according to instructions provided thereto as understood in the art. The instructions can be executed out of order and are buffered, combined, and queued as part of performing loads and stores. Execution by the processor 100 includes speculative execution of instructions past a branching address or other non-currently-determined address in memory such as in the L1 memory cache 106. For sake of simplicity, the processing core 101 and its components are referred to collectively as a core unit.

The store queue 102 is responsive to store requests 107. The store requests 107 are buffered in the store buffer 103 before being committed into the memory system 115. The speculative load queue 105 is responsive to and holds load requests 108 as instructions and data are operative in the processing core 101. Other requests and events are also operative in the processing core 101 of the processor 100. For example, a speculative load (LS) request is operative to load instructions speculatively in a speculative execution mode with respect to the speculative load queue 105 when the processor is in the speculative execution mode.

Beyond the L1 memory cache 106, the processor 100 also includes at least one additional processor-local memory such as the L2 memory 110 that the L1 memory cache 106 coherently shares. According to some embodiments, the L1 memory cache 106 is coherent with other L1 memory caches of other processing cores and coherent with the L2 memory 110 as facilitated by the directory 111. The L1 memory cache 106 and the L2 memory 110 are inclusive. The processor 100 includes the directory 111 to manage coherency states of cachelines of the L1 memory cache 106 and the L2 memory 110. A first set of coherency states 109 reside in one or more structures of the L1 memory cache 106. A second set of coherency states 112 reside in one or more structures of the directory 111.

The processor 100 includes the one or more predictors 113 to provide predictions to the processing core 101. For example, the one or more predictors 113 include a branch target predictor (BTP). The BTP uses a branch target buffer (BTB) to store and manage values, addresses, flags, and so forth. At least one of the predictors 113 provides a prediction target for speculative execution of instructions past an unresolved conditional branch during execution of a set of instructions (not illustrated) by the processing core 101.

While the speculative load queue 105 and the L1 memory cache 106 are illustrated, the techniques described herein are applicable to any core and any processor with an ability to issue a speculative load such as, for example, via a respective load message to a processor memory system. The load message is also commonly known as a load instruction or just a "load" in terms of memory operations. For ease of explanation, in at least some embodiments, a total store order (TSO) memory consistency is implemented in the L1 memory cache 106 and the L2 memory 110, and the processing core 101 is single threaded. In other embodiments, the same mechanisms described herein are applied to and implemented with multi-threaded cores, and the described mechanisms would then allow multiple data and/or instruction loads per unit number of clock cycles on each multi-threaded core. Additional mechanisms for handling multi-threaded operations are then implemented consistent with the other mechanisms described herein including the memory coherency mechanisms.

According to some embodiments, out-of-order scheduling in the processor 100 occurs by translating application code in a software layer into native instruction set architecture (ISA) code. During execution, the ISA code then may be reordered such as in the reorder buffer 104 and scheduled to improve instruction-level parallelism. Reordering and optimization are done on portions of code known as translation windows. Certain code within the translation window is speculatively executed in a speculation window such as on a per-core basis. That is, each core such as processing core 101 operates in a speculation window when speculatively executing instructions. Speculative operations are performed out of the speculative load queue 105. If the speculative execution proceeds without error, the changes resulting from the speculative execution are committed. If there is an error during speculative execution, the speculative changes are reverted back in a process referred to as rollback. Rolled back code may then be executed sequentially without reordering in order to determine the precise point of error.

To maintain memory coherency during instruction execution, the processor 100 implements a specified coherency scheme. Memory coherence refers to consistency of data stored in caches and other memory, such as the shared L2 memory 110, and the separate L1 memory cache 106 for the processing core 101. Processor consistency refers to execution of re-ordered instructions in a manner which produces the same results as execution of the instructions in order. The techniques described herein provide processor consistency and memory coherency within the same core 101, within the processor 100, with re-ordered code, and with speculative loading of instructions from one translation window into a next or a current translation window.

Each cacheline of the private L1 memory cache 106 and each cacheline of the L2 memory 110 are coherently maintained by way of a cache coherency protocol that includes coherency states illustrated as the first set of states 109 and the second set of states 112. The states 109, 112 include a speculative-modified ($M_{SPEC}$) state, a modified (M) state, an owned (O) state, a shared (S) state, and an invalid (I) state. The states 112 are built into and stored in one or more memory structures of the directory 111 such as in a state tracking vector and the state 112 is stored in a state field of the state tracking vector. States 109, 112 are stored in the form of one or more bits or as a state indicator such as bit in a particular register, bit, or memory cell. The cache coherence protocol arbitrates communication between the L1 memory cache 106 and the shared L2 memory 110.

For sake of simplicity in describing certain operations, the L1 memory cache 106 is described as having a cacheline storing a single value having one coherency state while the L2 memory 110 is described as having cachelines such that the L1 cacheline and L2 cachelines are of a same length. In other embodiments, the L1 memory cache 106 stores cache blocks of a shorter length than cachelines of L2 memory such that L2 cachelines store two or more cache blocks as two or more payloads per L2 cacheline. In these embodiments, each L1 cache block has its own coherency state and each L2 cacheline has its own coherency state. In yet other embodiments, other types of cache and memory structures are used and are tracked by way of one or more cache states. Unless otherwise indicated, a state can apply equally to a respective cache block and cacheline.

Generally, the directory 111 keeps track of sharer information that includes one or more current states of a plurality of possible states for each cacheline of the L1 memory cache 106 and one or more corresponding cachelines of the L2 memory 110 as further described herein. In terms of security and memory structure boundaries, instead of placing speculative execution instructions and data in the L1 memory cache 106, all speculative execution is placed in, and operated from, one or more of the store queue 102, the store buffer 103, the reorder buffer 104, and the speculative load queue 105. The speculative execution is subsequently performed without altering the L1 memory cache 106 as during non-speculative execution. A corresponding speculative execution state is stored as one of the states 112 of the directory 111 and one of the states 109 in the L1 memory cache 106 to track which mode of operation is in effect and which structures of the processor 100 are used. Thereby, arbitrary data cannot be exfiltrated from the corresponding L1 memory cache 106 during speculative execution of instructions associated with a particular process executing on the processing core 101. This particular arrangement of components and use of the speculative execution state prevents side channel attacks against the data and instructions in the L1 memory cache 106.

Figure 2:
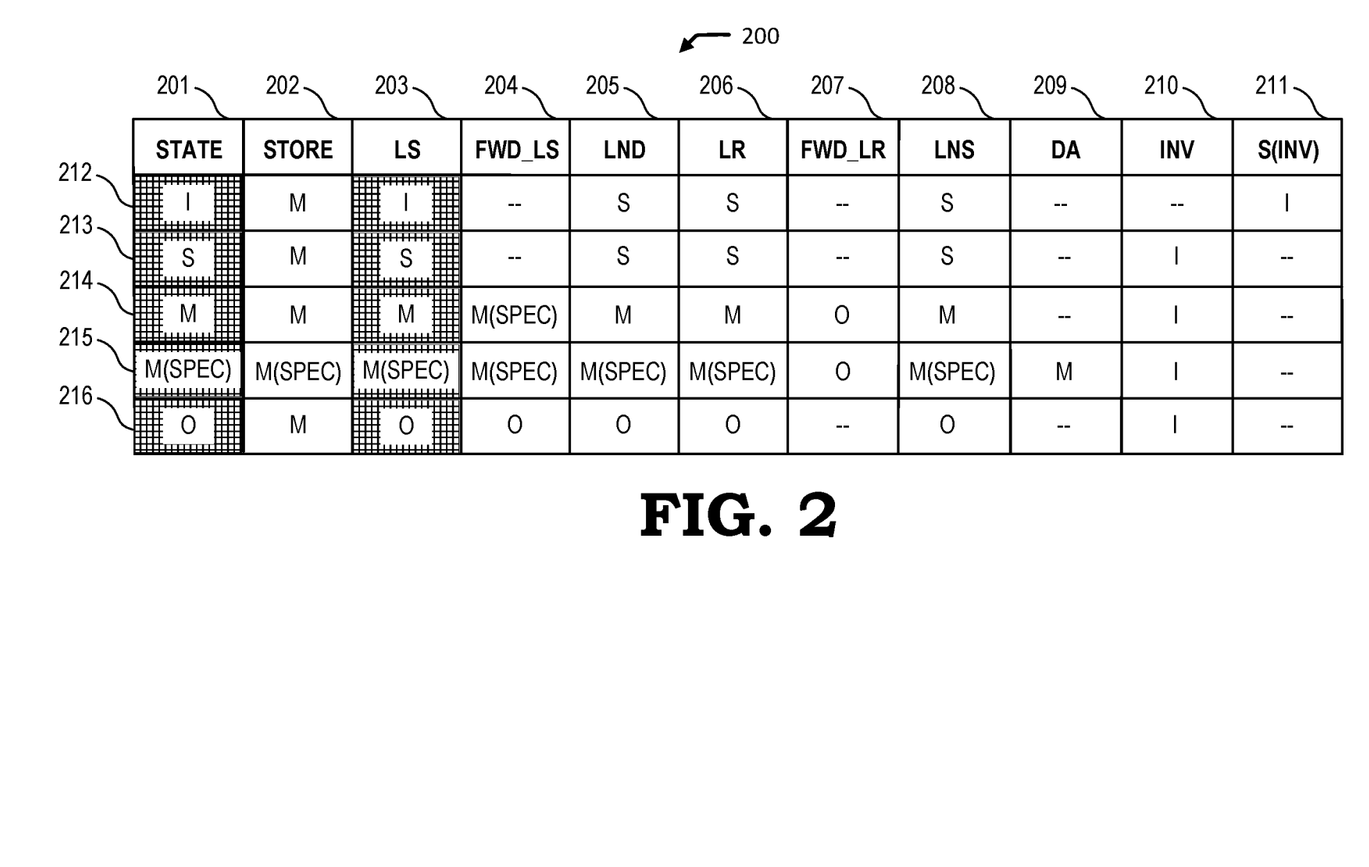
FIG. 2 is a state transition table that describes transitions of a cacheline between memory states according to cache coherency protocol in accordance with some embodiments.

FIG. 2 is a state transition table 200 that describes transitions of cachelines between cache coherency states according to a cache coherency protocol in accordance with some embodiments. The state transition table 200 is for the L1 memory cache 106 and its states 109. A second and separate state transition table (not illustrated) consistent with the state transition table 200, and similar thereto, describes the states 112 of the directory 111 as understood by those in the art.

In the state transition table 200, a first column illustrates a set of five states 201, one per row, in no particular order. Only five states 201 are illustrated to explain operation of speculative execution of instructions by the processor 100. Other states are possible consistent with cache coherency and managing cachelines in a multi-core processor such as processor 100. The states 201 are illustrated as states 109 of the L1 memory cache 106 and the states 112 of the directory 111 of the processor 100. The five states 201 change along a respective row to another state based on one of ten load/store message types when one or more messages are sent from a first memory entity to a second memory entity in the processor 100. That is, in a next ten columns 202-211 of the state transition table 200, there is listed a possible new state in relation to the initial states 201. Each new state is reached in response to an event such as a respective load/store request or message as indicated in the top row. State transitions are implemented by one or more memory controllers and one or more directory controllers operative in the processor 100. The event used or observed by the L1 memory cache 106 and the L2 memory 110 depends on the particular current state in which the cacheline of the L1 memory cache 106 or in which the cacheline of the L2 memory 110 in question is in. The load/store message is referred to herein as a "load" or "store" but is also commonly known as a load or store request or message.

The states 201 include an invalid (I) state 212, a shared (S) state 213, a modified (M) state 214, a speculative-modified ($M_{SPEC}$) state 215, and an owned (O) state 216. For sake of naming, the protocol described herein is referred to as the $M_{SPEC}$-MOSI cache coherency protocol.

The illustrated events 202-211 are abbreviated in the table 200 as follows. A store event refers to a store command or "STORE" request 202 from a remote L1 memory cache where, in some embodiments, remote refers to an L1 memory cache of another processing core of the processor 100. An LS event refers to a speculative load or "Load-Speculative" request 203. An FWD_LS event refers to a forwarded speculative load request 204. An LND event refers to a load no data or "LoadNoData" request 205. A LR event refers to a load replay or "LoadReplay" request 206. A FWD_LR event refers to a forwarded LR request 207. An LNS event refers to a non-speculative load or "LoadNonSpeculative" request 208. A DA event refers to a done acknowledgement or "DoneAck" message 209. An INV event refers to an invalidation message 210 sent to an L1 memory cache 106. Finally, an S(INV) event refers to a speculation invalid or "SpeculationInvalid" message 211. The LS event, the FWD_LS event, the LND event, the LR event, the FWD_LR event, the DA event, and the S(INV) event are events to facilitate use of speculative load queues or speculative load queues in the processor 100 such as the speculative load queue 105 and these events in the form of requests 203-207, 209, 211 are events beyond those associated with a MOSI-type cache coherency protocol.

Returning to the states 212-216 of the state transition table 200, the invalid state 212 indicates that a cacheline is either not present in the respective current L1 memory cache 106 or has been invalidated such as by way of a memory bus request. The shared state 213 indicates that the cacheline is unmodified and exists in a read-only state in at least one memory cache. The M state 214 indicates that only one cache of L1 memory caches in the processor 100 has a valid copy of the cacheline, and a value in the cacheline is likely different (updated) from the value in the L2 memory 110. According to an illustrative usage, the modified state has a similar meaning as a dirty state of a write back cache except that the M state 214 also communicates exclusive ownership of the cacheline. The M state 214 communicates that the cache value is different than the value in the cacheline of the L2 memory 110 and that the cache value is cached in only one location: in only one of the L1 memory caches of processor cores of the processor 100.

The $M_{SPEC}$ state 215 refers to a speculative execution state. The $M_{SPEC}$ 215 state allows a core of the processor 100 such as the processing core 101 to maintain its write permission under a speculative memory load. According to some embodiments, the $M_{SPEC}$ state 215 also communicates exclusive ownership of the cacheline. The $M_{SPEC}$ state 215 in the directory 111 facilitates communication to the various structures in the processor 100 that a respective speculative load queue of a processing core, such as the speculative load queue 105, is being used for cache values and cache instructions and that these values and instructions are found in the respective speculative load queue 105 instead of entries in its corresponding L1 memory cache 106. Although the L1 memory cache 106 in the $M_{SPEC}$ 215 state is required to notify the directory 111 of a write (store), this $M_{SPEC}$ 215 state is at least similar to the M state 214 from the core perspective such that those loads and stores operate without delay as if in the M state 214. Hence, the state change between the M state 214 and the $M_{SPEC}$ state 215 is undetectable by another process operative on the same processing core 101 or on a different core for a process operative, for example, in the processing core 101.

Additionally, as shown in the state transition table 200, a LoadSpeculative (LS) load 203 does not change a cache state as the M state 214 and the $M_{SPEC}$ state 215 are treated similarly by the processing core 101. This result is evident, for example, by the shading in the first and third columns and by comparing the first or beginning state 201 with a second state or a next state as in the third column corresponding to the LS load 203 when a LS load 203 is issued. Thus, the cache state of the L1 memory cache 106 and the state of the overall processor 100 are unaffected during speculative execution on any of the cores of the processor 100 with this cache coherence protocol until one or more results of speculative execution in the particular processing core are committed. According to at least some embodiments, committing of execution of instructions includes retiring an instruction and storing data into the memory system 115 across the memory bus 114.

The owned state 216 indicates non-exclusive ownership such that multiple L1 memory caches in the processor 100 illustrated as the L1 memory cache 106 may hold a most recent and correct value of the cacheline and the cache value in the corresponding cacheline of the L2 memory 110 may or may not be correct. At any one time, only one L1 memory cache 106 can have the owned 216 state for a cacheline and all other L1 memory caches of other (non-illustrated) processing cores with a same cacheline must be in a shared state 213.

Associated with the state transition table 200, there are at least four types of memory cache load requests (e.g., issued by a load or load message) that can be issued to the memory system such as to the L1 memory cache 106 and the L2 memory 110. These requests include: (1) a LoadSpeculative (LS) load 203, (2) a LoadNoData (LND) request 205, (3) a LoadReplay (LR) request 206, and (4) a LoadNonSpeculative (LNS) request 208. Each of these load types is now further described.

(1) LoadSpeculative. The LS load 203 refers to a speculatively executed load instruction issued to one of the L1 memory caches in the processor 100. On an L1 memory cache hit, the LS load 203 behaves according to the modified, owned, shared, and invalid (MOST) cache coherency states explained above since the cacheline is already found in the particular L1 memory cache 106. However, on an L1 memory cache miss, the LS load 203 reaches the directory 111 and the directory 111 forwards the request to a non-exclusive owner (O) of a cacheline, where the owner refers to the corresponding L1 memory cache 106. The forwarded request is a forward-load-speculative (FWD_LS) request as indicated by a FWD_LS state 204. On receiving the FWD_LS message, the L1 memory cache owner, corresponding to the O state 216, forwards its data to the requestor L1 memory cache 106 as if the request were an ordinary LR request 206. However, the exclusive owner in the M state 214 is placed into the $M_{SPEC}$ state 215 by updating its state 112 in the directory 111 after forwarding the data to the requestor L1 memory cache; the new state is indicated in the third box from the top of the table 200 in the fourth column corresponding to the FWD_LS 204 load. The $M_{SPEC}$ state 215 is similar to the M state 214 except, for example, a new store request to the $M_{SPEC}$ state 215 sends a "DataBlockModified" request to the directory 111. The directory 111, on receiving the DataBlockModified request, broadcasts "SpeculationInvalid" invalidation messages to each of one or more of the L1 memory caches in the processor 100, illustrated as L1 memory cache 106, that are speculative-sharers. According to some embodiments, a speculative-sharer is indicated by a bit or data value corresponding to which of the L1 memory caches 106 in the processor 100 is the speculative-sharer for the particular cacheline, and this bit or data value is stored in a structure in the directory 111 such as in a dedicated speculative sharer vector or a buffer or as a bit in another type of structure. Further, upon sending the DataBlockModified request, a "DoneAck" message—indicated as a DA message 209—is sent back to the L1 memory cache 106 in the $M_{SPEC}$ state 215. On receiving the DA message 209, the particular L1 memory cache 106 moves from the $M_{SPEC}$ state 215 back to the M state 214 as indicated in the fourth box in the ninth column indicated as the DA 209 message. The SpeculationInvalid message is treated as an invalidation (I) notification by the particular the L1 memory cache 106 and the L1 memory cache 106 in question replays the speculative load that previously read that cacheline. During load replay, depending on the load type of that load replay, the process continues with reissuing the suitable load message among the different types of load requests.

A data response for a LS load 203 does not install or load any data in the L1 memory cache 106 but instead is directly forwarded by the directory 111 such that all speculative execution is placed in one or more of: the store queue 102, the store buffer 103, the reorder buffer 104, and the speculative load queue 105. In some embodiments, the speculative load queue 105 is similar to a load queue and is in place of a load queue of a conventional processor and processing core. The speculative load queue 105 includes a speculative-when-exclusive ("SpecWhenExclusive" or SWE) bit. In other embodiments, a speculative load structure of the directory 111 is augmented with the SWE bit for a cacheline and this SWE bit is set only when a speculative load gets its value from an exclusive owner (M state).

The micro-architectural states 212-216 of the L1 memory cache 106 have not changed during this entire LoadSpeculative transaction due to the use of the $M_{SPEC}$ state 215 and presence and use of the speculative load queue 105. The exception is that the $M_{SPEC}$ state 215 can change to the M state 214, and vice versa. These state changes are not changed in, for example, the L1 memory cache 106, the L2 memory 110, and the directory 111. The cache coherence state is permitted to change between the $M_{SPEC}$ state 215 and the M state 214 but cannot be detected since the $M_{SPEC}$ state 215 and the M state 214 behave as core requests and cache contents are not changed.

Without a change of state, no speculative execution side channel attack can occur within the L1 memory cache 106 at least in part because memory block or memory cacheline addressing of the speculative load queue 105 is unrelated to that of the L1 memory cache 106. An attack cannot occur because a cache coherence state change from the $M_{SPEC}$ state 215 and the M state 214 during a speculation execution is undetectable by the processing core 101, and the L1 memory cache contents of the L1 memory cache 106 are not changed during the speculative execution. Data that are provided by way of a data response, such as by way of a response to a LoadSpeculative request, are not installed in the L1 memory cache 106, but are provided to or directly forwarded to another location including one of the store queue 102 and the speculative load queue 105 for subsequent speculative execution by the processing core 101.

When a load reaches the head of the speculative load queue 105, and the corresponding instruction is to be executed and data modified thereby in the processor 100, the speculative load queue entry of the speculative load queue 105 corresponding to that load is inspected to see if its SWE bit is set. If that SWE bit is not set, a "LoadNoData" (LND) request 205 is issued to the L2 memory 110 and the load retires. The LND request 205 is indicated in the fifth column of the state transition table 200. If the SWE bit is set such as in a structure in the directory 111, the load must be reissued and replayed with a "LoadReplay" (LR) request 206 as indicated in the sixth column of the state transition table 200 to make sure the cacheline of the L2 memory 110 has not been modified between the speculative execution and a commit by the L1 memory cache 106 in the $M_{SPEC}$ state.

(2) LoadNoData (LND). A LND request 205 is also issued with reference to the L1 memory cache 106, but the LND request 205 only requests cache state changes from the directory 111. Since the particular L1 memory cache 106 already has the most up-to-date copy of the data in its speculative load queue 105, store queue 102, or reorder buffer 104, the LND request 205 only requires cache state changes. The cache state changes caused by this LND request 205 is operative in a similar way as cache state changes caused by non-speculative loads to the L1 memory cache 106. The LND request 205 also updates a sharer status in the directory 111 and removes the requesting processing core from a speculative sharer list associated with the particular cacheline entry in the directory 111 as further described below. If a store request 202 from a remote L1 memory cache 106 beats the LND request 205 to the directory 111, a response fetches the most up-to-date data from that remote L1 memory cache and behaves like a load response with data.

(3) LoadReplay (LR). LR requests 206 are issued when the SWE bit of a retiring load is set. On an L1 memory cache hit in the respective L1 memory cache 106, the load can immediately retire. On an L1 miss, the LR request 206 is forwarded to the directory 111 and the directory 111 moves the requestor from a speculative-sharer status in the directory 111 to a sharer status in the directory 111. According to some embodiments, such a status change includes removing an entry in a speculative sharer vector to a sharer vector for the cacheline. This LR request 206 is then forwarded as a Fwd_LoadReplay (FWD_LR) request 207 to the exclusive L1 memory cache owner. The exclusive owner then moves from either an M state 214 or an $M_{SPEC}$ state 215 to the O state 216 as indicated in the third and fourth boxes of the seventh column indicated as the FWD_LR request 207.

If the exclusive L1 memory cache owner 106 has an unacknowledged DataBlockModified request pending in its reorder buffer 104, then the exclusive L1 memory cache owner responds back with a latest version of the data before moving to the O state 216. This latest data is then forwarded to the L1 memory cache requestor and the L1 memory cache requestor replays the mis-speculated load. If the exclusive owner does not have an unacknowledged DataBlockModified message pending, the exclusive L1 memory cache owner responds to the forwarded request with an ACK message and the L1 memory cache requestor can retire the load along with installing the data from that load in its respective private L1 memory cache 106.

(4) LoadNonSpeculative (LNS). In this fourth type of load, a non-speculative load (LNS) 208 as indicated at the top of the eighth column of the state transition table 200 is issued by the L1 memory cache 106 to the directory 111. The respective speculative load queue 105 is not used. This LNS load 208 applies to instructions and data that are executed without a need for speculative execution.

Figure 3:
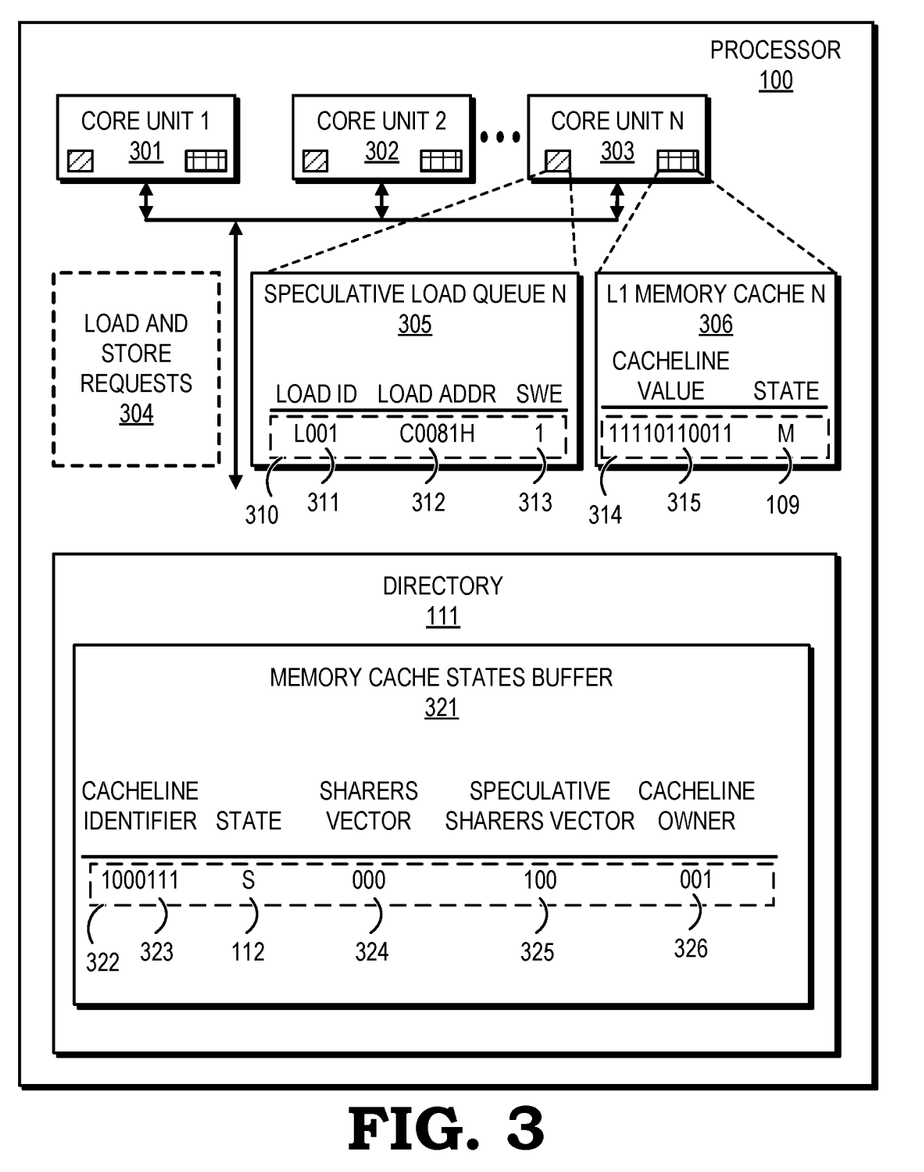
FIG. 3 is a block diagram of the processor of FIG. 1 illustrating further processor components in accordance with some embodiments.

FIG. 3 is a block diagram of the processor 100 illustrating further processor components in accordance with some embodiments. The processor 100 includes three core units 301-303 first illustrated as processing core 101 that interact with other elements including the directory 111. The three core units 301-303 represent 1-N number of processing cores in the multi-core processor 100. Each of the core units 301-303 includes a respective reorder buffer 104 and the reorder buffers of the core units 301-303 provide load and store requests 304 to the core units 301-303. For sequential consistency of memory operations, all loads are treated as acquires.

Each of the core units 301-303 also includes a respective speculative load queue with a speculative load queue N 305 illustrated in expanded view for core unit N 303. Each speculative load queue 105 includes a plurality of fields for each entry 310 therein including a load identifier (load ID) 311, a load address 312 abbreviated "LOAD ADDR," and a "SpecWhenExclusive" (SWE) bit 313 as explained in reference to the LR request 206 of the state transition table 200. According to some embodiments, entries 310 in the speculative load queue 105 are retired in a first in first out (FIFO) manner.

During speculative execution, a reservation station or other structure in the processor 100 is no longer responsible for scheduling certain load accesses to satisfy coherency constraints of entries in the L1 memory caches and the L2 memory 110. After speculation, a cache load (load instruction) is issued from the speculative load queue 105, such as the speculative load queue N 305 for the core unit N 303, as soon as the speculative load effective address is computed. During speculation, the speculation mechanism includes issuing the load as soon as possible and using a speculated result when the result is known and returned to the speculative load queue 105. The load ID 311, the load address 312, and SWE bit 313 are used when executing or completing loads from the speculative load queue N 305. For example, the load address 312 includes an off-chip memory system address such as an address in the memory system 115.

Each of the core units 301-303 also includes a respective L1 memory cache 106 with an L1 memory cache N 306 illustrated in expanded view for core unit N 303. The L1 memory cache N 306 includes cachelines 314 where each of the cachelines 314 includes one or more fields: a cacheline value 315 and a cache coherency state 109. The cache coherency state 109 takes one of the plurality of values illustrated in the state transition table 200. An L1 memory cache controller (not illustrated) updates the cachelines 314 of the L1 memory cache N 306.

The directory 111 includes additional structures including a memory cache states buffer 321 for storing information for respective core units 301-303 and cachelines. Each entry 322 in the memory cache states buffer 321 includes: a cacheline identifier 323, a cache coherency state 112 of a respective cacheline, a sharers vector 324, a speculative sharers vector 325, and a cacheline owner 326. The vectors 324, 325 as illustrated includes one bit for each core unit 301-303. The memory cache states buffer 321 facilitates management of the states 109, 112 and proper responses to the load and store requests 304. The memory cache states buffer 321 is a state tracking buffer. As illustrated, there is one sharers vector 324 and one speculative sharers vector 325 for each entry 322 where each vector 324, 325 includes one bit for each of the core units 301-303 to track the states of the cachelines of the core units 301-303 and the L2 memory 110. The bits of the sharers vector 324 and the speculative sharers vector 325 are updated as states transition from one state to another state consistent with the state transition table 200 where a value of one corresponds to a positive indication and a value of zero corresponds to a negative indication for a sharing state and a speculative sharing state in the sharers vector 324 and the speculative sharers vector 325, respectively.

The processor 100 uses the memory cache states buffer 321, the sharers vectors 324, the speculative sharer vectors 325, and the cacheline owner values to track the various states 212-216 shown in the state transition table 200 for the L1 memory cachelines 314 and the corresponding L2 memory cachelines. For example, the directory 111 creates an entry 322 in the memory cache states buffer 321 for each of the instructions loaded in the speculative load queues 105 and sets the SWE bit 313 of the entry 310 when needed.

Operations of the four types of memory cache loads in relation to the memory cache states buffer 321 are now further described. When a speculatively executed load (LS load) 203 is issued to one of the L1 memory caches of the core units 301-303, and on an L1 memory cache hit, the state 109 is updated and behaves according to the modified (M), owned (O), shared (S), and invalid (I) cache coherency states explained above. However, on an L1 memory cache miss, the LS load 203 reaches the directory 111 and the directory 111 forwards the request to a non-exclusive owner (O) of a cacheline 314, where the owner refers to the corresponding L1 memory cache. The forwarded request is a forward-load-speculative (FWD_LS) request. On receiving the FWD_LS message, the L1 memory cache owner is in the M state and this state is indicated in its respective state 109 in the cacheline 314, and the M state is changed by the directory 111 to the $M_{SPEC}$ state in its state 112 in its entry 322 in the memory cache states buffer 321 after the owner L1 memory cache forwards the data to the requestor L1 memory cache. A "DataBlockModified" request is sent to the directory 111. The directory 111, on receiving the DataBlockModified request, broadcasts "SpeculationInvalid" invalidation messages to each of the L1 memory caches that are speculative sharers as indicated in respective bits of the speculative sharers vector 325, and their M states are changed to the $M_{SPEC}$ state.

In response to sending the DataBlockModified request, the directory 111 sends a "DoneAck" message back to the originating L1 memory cache 106 that is now in the $M_{SPEC}$ state. On receiving the DA message, the originating L1 memory cache moves from the $M_{SPEC}$ state back to the M state. The SpeculationInvalid message is treated like an invalidation (I) notification by the originating L1 memory cache. The SWE bit 313 is set only when a speculative load gets its value from an exclusive owner which is in the M state (or in the $M_{SPEC}$ state).

When a load reaches the head of the speculative load queue N 305, and the corresponding instruction is to be executed and data modified thereby in the processor 100, the speculative load queue entry 310 of the speculative load queue N 305 corresponding to that load is inspected to see if its SWE bit 313 is set (e.g., set to 1). If that SWE bit 313 is not set, a "LoadNoData" (LND) request is issued to the L2 memory 110 and the load retires. If the SWE bit 313 is set, the load must be reissued and replayed with a "LoadReplay" (LR) request to make sure the cacheline 314 has not been modified by observing its recorded state 109 between the speculative execution and the commit by the L1 memory cache 106 in the $M_{SPEC}$ state.

As needed, an LND request updates a sharer status in the directory 111 by changing the state 112 of the entry 322 in the memory cache states buffer 321. If a store request from a remote L1 memory cache beats the LND request to the directory 111, an LND response fetches the most up-to-date data from that remote L1 memory cache and behaves like a load response with data.

LR requests are issued when the SWE bit 313 of a retiring load is set in the speculative load queue N 305. On an L1 memory cache hit in the respective L1 memory cache, the load of the speculative load queue N 305 can immediately retire. On an L1 miss, the LR request is forwarded to the directory 111 and the directory 111 changes the requestor L1 memory cache from its speculative sharer status in the speculative sharers vector 325 to a sharer status in the sharers vector 324. This LR request is then forwarded as a FWD_LR request to the exclusive L1 memory cache owner. The exclusive owner then changes from either an M state or an $M_{SPEC}$ state to the O state by changing its state 109 in its L1 memory cache 106 of a respective core unit 301-303. If the exclusive L1 memory cache owner 106 has an unacknowledged DataBlockModified request pending in its reorder buffer 104, then the exclusive L1 memory cache owner 106 responds back with a latest version of the data before moving to the O state by changing its state 109.

A non-speculative load (LNS) is issued by the directory 111 to the respective L1 memory cache 106 of a respective core unit 301-303. The respective speculative load queue 105 is not used. The LNS load applies to instructions and data that are executed without a need for speculative execution.

Figure 4:
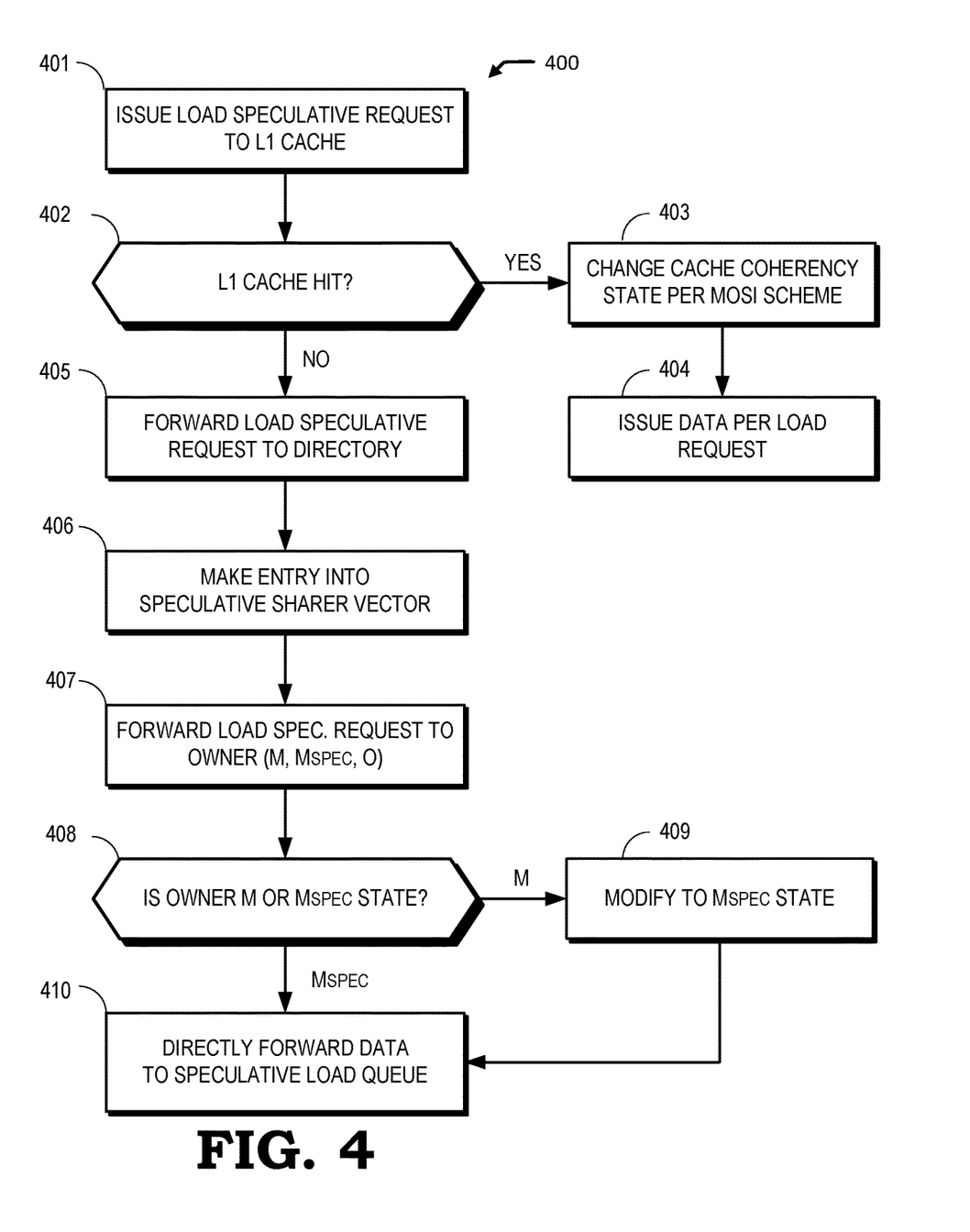
FIG. 4 is a block diagram of a method implementing state transitions for a speculative load in accordance with some embodiments.

FIG. 4 is a block diagram of a method 400 implementing state transitions for a speculative load in accordance with some embodiments. At block 401, a load speculative (LS) request is issued to an L1 memory cache. At block 402, it is determined whether the LS request results in an L1 memory cache hit. If so, at block 403, a cache coherency state is changed based on a now-current M, O, S, and I state as explained above. At block 404, one or more data are issued per the LS request. If not, at block 405, the LS request is forwarded as a forward load speculative request to a directory such as the directory 111 of FIG. 1. At block 406, an entry is made into a speculative sharers vector such as the speculative sharers vector 325 of an entry 322 in the memory cache states buffer 321. And, at block 407, a forward LS request is forwarded to its owner in one of the $M_{SPEC}$ state 215, the M state 214, and the O state 216. At block 408, it is determined whether the owner is in the M state 214 or the $M_{SPEC}$ state 215. At block 409, for the M state 214, the owner is transitioned or modified to the $M_{SPEC}$ state 215 and at block 410 data is directly forwarded to the speculative load queue 105. For the owner already in the $M_{SPEC}$ state 215, from block 408 to block 410, data is directly forwarded to the speculative load queue 105 and no transition to the $M_{SPEC}$ state 215 is needed or performed.

Figure 5:
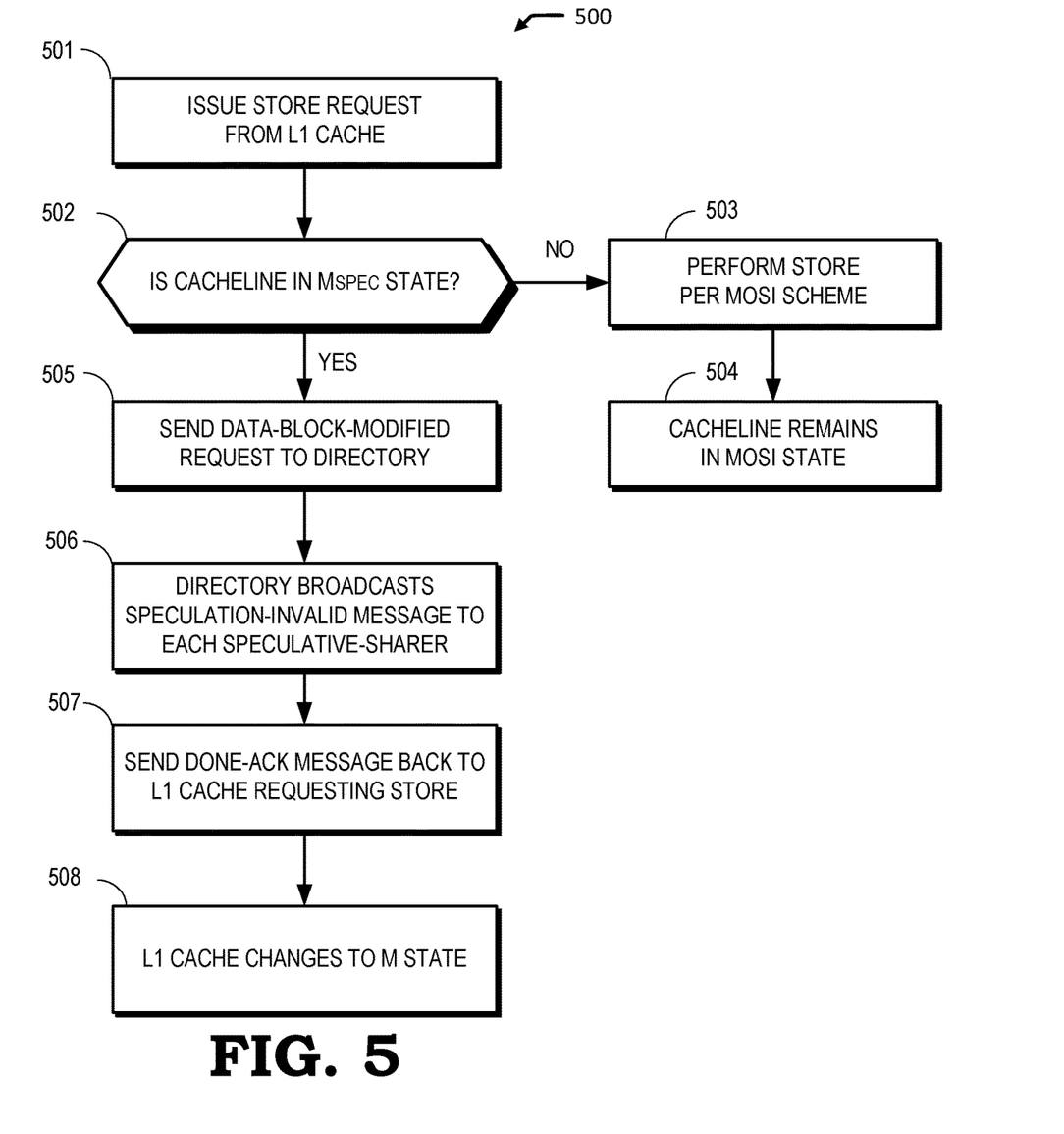
FIG. 5 is a block diagram of a method implementing a store request in a speculative execution mode in accordance with some embodiments

FIG. 5 is a block diagram of a method 500 implementing a store request in a speculative execution mode in accordance with some embodiments. At block 501, a store request is issued from an L1 memory cache. At block 502, it is determined whether the cacheline to be stored is in the $M_{SPEC}$ state 215. If not, at block 503, the store is performed per one of the M, O, S, and I state as explained above, and, at block 504, the cacheline remains in its M, O, S, and I state. If the cacheline is in the $M_{SPEC}$ state 215, at block 505, a data-block-modified request is sent to the directory 111. At block 506, the directory broadcasts a speculation-invalid message to each speculative sharer associated with the cacheline such as the speculative sharers indicated in the bits of the speculative sharers vector 325. At block 507, the directory sends a done-acknowledge message back to the L1 memory cache that is issuing the store request. At block 508, the L1 memory cache changes to the M state 214.

Figure 6:
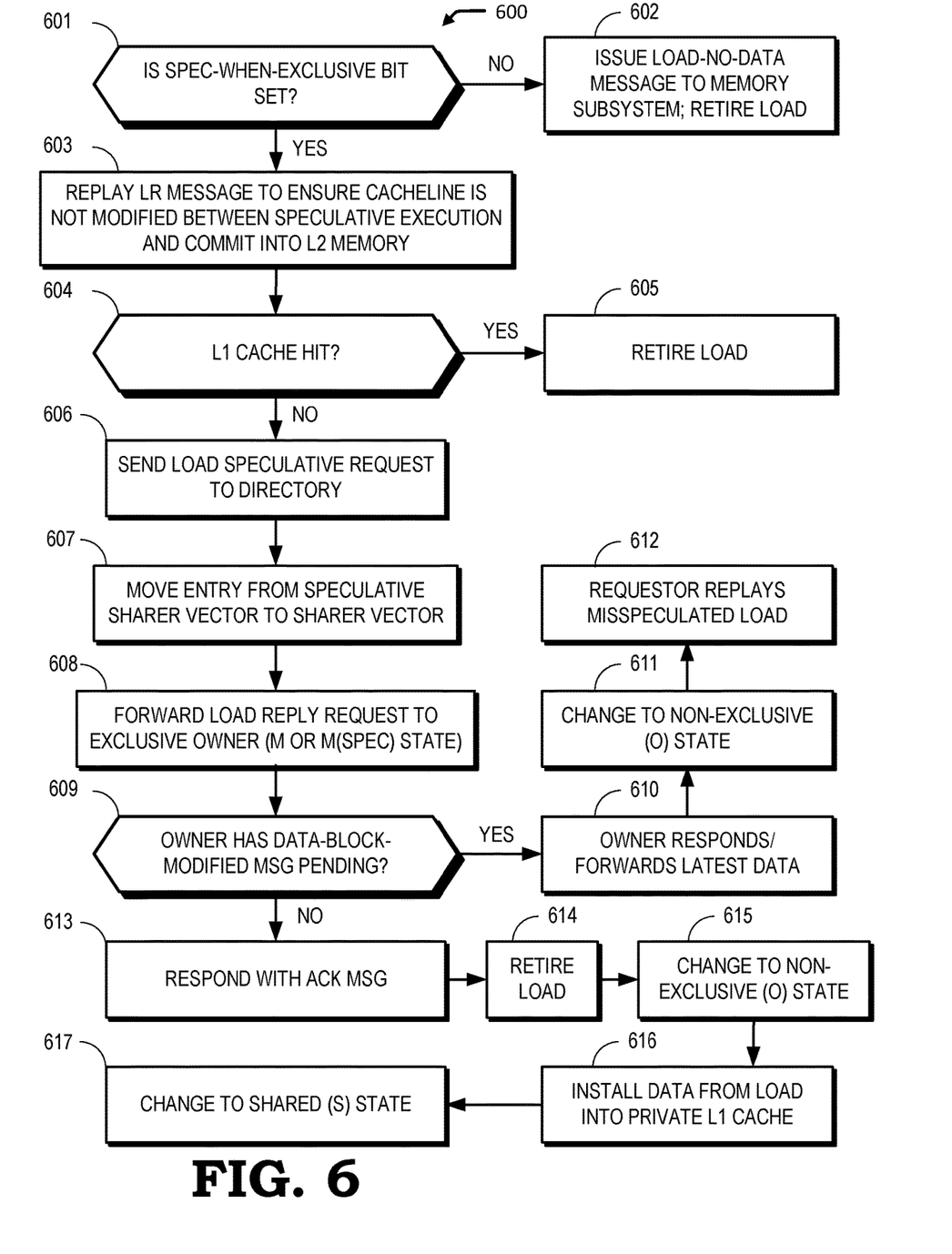
FIG. 6 is a block diagram of a method implementing state transitions for a speculative load in accordance with further embodiments.

FIG. 6 is a block diagram of a method 600 implementing state transitions for a speculative load in accordance with some embodiments. The method 600 includes determining whether a speculative-when-exclusive (SWE) bit is set for a particular load speculative (LS) request at block 601. If not, at block 602, the directory issues a load-no-data (LND) message to the memory subsystem and retires the LS request. If so, at block 603, a load replay (LR) request such as LR request 206 is replayed to ensure that the cacheline in question is not modified between the speculative execution and a commit into the L2 memory. At block 604, it is determined whether the load is an L1 memory cache hit. If so, the load request is immediately retired at block 605 without further action. If not, at block 606, a load speculative (LS) request is sent to the directory 111. At block 607, an entry is moved from the speculative sharer vector to the sharer vector. That is, the entry in the speculative sharer vector is erased, and an entry in the sharer vector is added thereto. At block 608, the processor 100 issues a forward load reply (FWD_LR) request 207 to the exclusive owner that is in either the M state 214 or the $M_{SPEC}$ state 215. This is indicated at the FWD_LR column of FIG. 2. At block 609, it is determined whether the owner has a data-block-modified message pending. If so, certain actions are taken at blocks 610-612. If not, certain other actions are taken at blocks 613-616.

At block 610, the owner responds by forwarding its latest data. At block 611, the owner is modified to the non-exclusive owner (O) state. At block 612, the requestor replays the mis-speculated load. At block 613, the processor responds by issuing an acknowledge message. At block 614, the processor retires the load request. At block 615, the owner is modified to the non-exclusive owner (O) state. At block 616, one or more data are installed based on the load into the private L1 memory cache. At block 617, the owner is transitioned to the shared (S) state.

In some embodiments, the apparatus and techniques described above are implemented in a system including one or more integrated circuit (IC) devices (also referred to as integrated circuit packages, microchips, and processors), such as the processor 100 described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processor comprising:
   a first core to execute computer instructions;
   a first private memory cache coupled to the first core;
   a speculative load queue coupled to the first core, the speculative load queue to store a plurality of cachelines for computer instructions executed speculatively at the first core, each cacheline of the plurality of cachelines storing a plurality of instructions; and
   a state tracking buffer having a state field to store a state for each cacheline of the plurality of cachelines in the speculative load queue, the state tracking buffer having a speculative execution state associated with a corresponding cacheline in the state tracking buffer, the speculative execution state signaling the processor to execute the computer instructions from the speculative load queue when the first core is in a speculative execution mode.

2. The processor of claim 1, wherein the processor is configured to:
   identify a branching instruction;
   responsive to the identified branching instruction, modify the state field to the speculative execution state associated with the corresponding cacheline in the state tracking buffer;
   execute the computer instructions from the speculative load queue for cachelines of the plurality of cachelines having the speculative execution state; and
   execute the computer instructions from the first private memory cache for cachelines of the plurality of cachelines having the state other than the speculative execution state.

3. The processor of claim 1, wherein the state field for each cacheline includes:
   a first state indicator for the speculative execution state to indicate whether the cacheline is speculatively modified in the first private memory cache.

4. The processor of claim 3, wherein the state field for each cacheline further includes:
   a second state indicator to indicate whether the cacheline is invalid in the first private memory cache;
   a third state indicator to indicate whether the cacheline is in a shared and non-modified state in the first private memory cache;
   a fourth state indicator to indicate whether the cacheline is modified and exclusively owned in the first private memory cache; and
   a fifth state indicator to indicate whether the cacheline is non-exclusively owned in the first private memory cache.

5. The processor of claim 4, further comprising:
   a sharers vector storing cachelines of the fourth state indicator for tracking which cachelines are modified and exclusively owned as the processor speculatively executes computer instructions; and
   a speculative sharers vector storing cachelines of the first state indicator, wherein the processor is further configured to transition each cacheline between the sharers vector and the speculative sharers vector when the cacheline is speculatively executed and in the speculative execution state.

6. The processor of claim 5, wherein each load request of the speculative load queue includes a speculative-when-exclusive (SWE) bit, and wherein the processor is further configured to:
   fulfill the load request; and
   transition each cacheline between the sharers vector and the speculative sharers vector in response to its SWE bit being set.

7. The processor of claim 4, further comprising:
   a second core;
   a second private memory cache coupled to the second core;
   a shared memory coupled to the first private memory cache and the second private memory cache; and
   a cache tracking vector including entries of cachelines in the shared memory, each cacheline entry corresponding to the cacheline of the respective entry in the state tracking buffer, each cacheline entry including one of the first, second, third, fourth, and fifth state indicators.

8. The processor of claim 1, wherein the processor is configured to:
   in response to a load speculative request for a first speculative cacheline, create an entry in the state tracking buffer for the first core including setting the state field to a speculative share state for the first speculative cacheline; and
   after resolving an unresolved conditional branch, retire the entry in the state tracking buffer.

9. A method for speculative execution in a directory-based cache coherence system, the method comprising:
   receiving a load speculative request to a local private L1 memory cache of a first processor core for a cacheline;
   for a local L1 memory cache miss:
      creating an entry into a speculative load queue for the cacheline;
      forwarding the load speculative request to a cacheline of a local private L1 memory cache of a second processor core;
      issuing data according to the load speculative request;
      determining whether the cacheline of the L1 memory cache of the second processor core is in a modified (M) state or a speculative-modified ($M_{SPEC}$) state, the $M_{SPEC}$ state indicating that the directory-based cache coherence system is to execute the cacheline from the speculative load queue, and the M state indicating that the directory-based cache coherence system is to execute the cacheline from the L1 memory cache;
      changing the M state to the $M_{SPEC}$ state when the cacheline of the L1 memory cache is in the M state; and providing data according to the load speculative request to a load queue of the first processor core when the cacheline of the L1 memory cache is in the $M_{SPEC}$ state.

10. The method of claim 9, further comprising:
identifying a branching instruction;
responsive to the identified branching instruction, modifying a state to the $M_{SPEC}$ state associated with its cacheline in a state tracking buffer;
executing computer instructions from the load queue for cachelines having the $M_{SPEC}$ state; and
executing the computer instructions from the L1 memory cache for cachelines having a state other than the $M_{SPEC}$ state.

11. The method of claim 9, further comprising:
for a local L1 memory cache hit:
setting a state for the cacheline to one of the M state, a non-exclusively owned (O) state, a shared (S) state, and an invalid (I) state; and
issuing data according to the load speculative request; and
for a local L1 memory cache miss:
forwarding the load speculative request to a directory, the directory configured to track cachelines at the first and second processor cores.

12. The method of claim 11, wherein the state for each cacheline includes:
a first state indicator to indicate the I state for the cacheline in the L1 memory cache;
a second state indicator to indicate whether the cacheline is in the S state, the S state indicating a non-modified state for the cacheline in the L1 memory cache;
a third state indicator to indicate whether the cacheline is in the M state, the M state indicating a modified and exclusively owned state for the cacheline in the L1 memory cache;
a fourth state indicator to indicate the $M_{SPEC}$ state, the $M_{SPEC}$ state indicating a speculatively modified state for the cacheline in the L1 memory cache; and
a fifth state indicator to indicate the O state, the O state indicating a non-exclusively owned state for the cacheline in the L1 memory cache.

13. The method of claim 12, further comprising:
storing a cacheline identifier for cachelines of the third state indicator in a sharers vector to track cachelines in the M state in the L1 memory caches of the first and second processor cores; and
storing a cacheline identifier for cachelines of the fourth state indicator in a speculative sharers vector to track cachelines in the $M_{SPEC}$ state in the L1 memory caches of the first and second processor cores, wherein the system transitions a cacheline between the sharers vector and the speculative sharers vector by modifying one or more of the sharers vector and the speculative sharers vector.

14. The method of claim 13, wherein each cacheline of the speculative load queue includes a speculative-when-exclusive (SWE) bit, and wherein the method further comprises:
transitioning a cacheline between the sharers vector and the speculative sharers vector in response to its speculative-when-exclusive bit being set.

15. The method of claim 11, further comprising:
creating a cacheline entry in a shared memory, the cacheline entry corresponding to the cacheline of a respective entry in a state tracking buffer; and
creating an entry in a cache tracking vector for the cacheline entry including one of the state indicators.

16. A non-transitory computer readable storage medium including instructions stored thereon, which when executed by a processor, cause the processor to perform operations comprising:
receiving a load speculative request to a local private L1 memory cache of a first processor core for a cacheline;
for a local L1 memory cache miss:
creating an entry into a speculative load queue for the cacheline;
forwarding the load speculative request to a cacheline of a local private L1 memory cache of a second processor core;
issuing data according to the load speculative request;
determining whether the cacheline of the L1 memory cache of the second processor core is in a modified (M) state or a speculative-modified ($M_{SPEC}$) state, the $M_{SPEC}$ state indicating that the processor is to execute the cacheline from the speculative load queue, and the M state indicating that the processor is to execute the cacheline from the L1 memory cache;
changing the M state to the $M_{SPEC}$ state when the cacheline of the L1 memory cache is in the M state; and
providing data according to the load speculative request to a load queue of the first processor core when the cacheline of the L1 memory cache is in the $M_{SPEC}$ state.

17. The non-transitory computer readable storage medium of claim 16, the instructions further causing the processor to perform operations comprising:
identifying a branching instruction;
responsive to the identified branching instruction, modifying a state to the $M_{SPEC}$ state associated with its cacheline in a state tracking buffer;
executing computer instructions from the load queue for cachelines having the $M_{SPEC}$ state; and
executing the computer instructions from the L1 memory cache for cachelines having a state other than a speculative execution state.

18. The non-transitory computer readable storage medium of claim 16, the instructions further causing the processor to perform operations comprising:
for a local L1 memory cache hit:
setting a state for the cacheline to one of the M state, a non-exclusively owned (O) state, a shared (S) state, and an invalid (I) state; and
issuing data according to the load speculative request; and
for the local L1 memory cache miss:
forwarding the load speculative request to a directory, the directory to track cachelines at the first and second processor cores.

19. The non-transitory computer readable storage medium of claim 18, wherein the state for each cacheline includes:
a first state indicator to indicate the I state for the cacheline in the L1 memory cache;
a second state indicator to indicate whether the cacheline is in the S state, the S state indicating a non-modified state for the cacheline in the L1 memory cache;
a third state indicator to indicate whether the cacheline is in the M state, the M state indicating a modified and exclusively owned state for the cacheline in the L1 memory cache;
a fourth state indicator to indicate the $M_{SPEC}$ state, the $M_{SPEC}$ state indicating a speculatively modified state for the cacheline in the L1 memory cache; and a fifth state indicator to indicate the O state, the O state indicating a non-exclusively owned state for the cacheline in the L1 memory cache.

20. The non-transitory computer readable storage medium of claim 19, the instructions further causing the processor to perform operations comprising:

storing a cacheline identifier for cachelines of the third state indicator in a sharers vector to track cachelines in the M state in the L1 memory caches of the first and second processor cores; and storing a cacheline identifier for cachelines of the fourth state indicator in a speculative sharers vector to track cachelines in the $M_{SPEC}$ state in the L1 memory caches of the first and second processor cores, wherein the processor transitions a cacheline between the sharers vector and the speculative sharers vector by modifying one or more of the sharers vector and the speculative sharers vector.

* * * * *